(12) United States Patent
Sakuda et al.

(10) Patent No.: US 7,942,648 B2
(45) Date of Patent: May 17, 2011

(54) AIR PUMP

(75) Inventors: Atsushi Sakuda, Osaka (JP); Noboru Iida, Osaka (JP); Tatsuya Nakamoto, Osaka (JP); Ryuichi Ohno, Osaka (JP); Kiyoshi Sawai, Osaka (JP); Hiroyuki Fukuhara, Osaka (JP); Hideki Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 984 days.

(21) Appl. No.: 11/630,258

(22) PCT Filed: Jun. 23, 2005

(86) PCT No.: PCT/JP2005/011550
§ 371 (c)(1),
(2), (4) Date: Dec. 21, 2006

(87) PCT Pub. No.: WO2006/001342
PCT Pub. Date: Jan. 5, 2006

(65) Prior Publication Data
US 2008/0044300 A1    Feb. 21, 2008

(30) Foreign Application Priority Data

Jun. 28, 2004   (JP) .................................. 2004-189183

(51) Int. Cl.
*F04B 17/00* (2006.01)
(52) U.S. Cl. ..................... 417/410.3; 417/365; 418/133; 418/238

(58) Field of Classification Search ............... 417/410.3, 417/321, 365; 310/90, 90.5, 51, 67 R; 418/131, 418/133, 236, 238, 265
See application file for complete search history.

(56) References Cited

U.S. PATENT DOCUMENTS

| | | | | | |
|---|---|---|---|---|---|
| 2,847,593 | A | * | 8/1958 | Selbach et al. | 310/90 |
| 4,132,512 | A | * | 1/1979 | Roberts | 418/23 |
| 4,820,140 | A | * | 4/1989 | Bishop | 418/152 |
| 4,823,034 | A | * | 4/1989 | Wrobel | 310/67 R |
| 5,258,672 | A | * | 11/1993 | Wrobel | 310/90 |
| 2006/0181168 | A1 | * | 8/2006 | Hargraves et al. | 310/90 |

FOREIGN PATENT DOCUMENTS

| | | | |
|---|---|---|---|
| JP | 58-165290 | | 11/1983 |
| JP | 61053484 | | 3/1986 |
| JP | 4-72492 | A * | 3/1992 |
| JP | 04072492 | | 3/1992 |
| JP | 07027073 | | 1/1995 |
| JP | 08121353 | | 5/1996 |
| JP | 2005240747 | | 9/2005 |

* cited by examiner

*Primary Examiner* — Charles G Freay
*Assistant Examiner* — Todd D Jacobs
(74) *Attorney, Agent, or Firm* — Steptoe & Johnson LLP

(57) ABSTRACT

Lifetime required of mobile-use fuel cells is secured and prolonged, stabilized pump performance is maintained by preventing bearing seizure and abnormal wear. The shaft (101) of a pump mechanism section (100) and the shaft (201) of a motor section (200) are integrated, and the shafts (101, 201) are supported by two or more ball bearings disposed in the pump mechanism section (100), thereby making it possible to fill grease in the closed spaces of the ball bearings (300), and secure a sufficient lifetime basically with almost no possibility of the grease leaking out, even if it is used at a relatively high environmental temperature.

9 Claims, 8 Drawing Sheets

AIR PUMP

The present application is based on International Application PCT/JP2005/011550, filed Jun. 23, 2005, which claims priority to Japanese Patent Application No. 2004-189183, filed Jun. 28, 2004.

TECHNICAL FIELD

The present invention relates to an air pump for an air supplier of mobile-use information terminal equipments using a fuel cell.

BACKGROUND ART

Mobile-use fuel cells are now under development, and an air pump that is suitable for supplying air to fuel cells has not yet been developed. For such air pump, supplied air should not include impurities such as oil, that is, the pump should be an oilless mechanism, the amount of supplied air should be 5 to 10 L/min, but pressure should be about ΔP=5 kPa to compensate pressure loss in the air passage of a fuel cell and blow the air, the diameter should be substantially 30 mm or less depending on the usage in a mobile, noise should be of low level, and the lifetime of several tens of thousands of hours should be achieved. Achieving the lifetime is particularly important among the foregoing characteristics and the component determining the lifetime is a bearing. A method improving the lifetime of a bearing known in the art is to form a lead groove and an oil storage (space) to prevent the oil from leaking outside (e.g. JP-A-7-312843).

FIG. 8 shows a fan motor disclosed in the above Patent Document of JP-A-7-312843. As for the configuration of the fan motor, metal sleeves 3 are arranged as bearings in a bearing stand 2 that is press-fitted in a casing 1, and a shaft 4 is inserted in the sleeves. A spiral groove 4' is formed along the surface of the shaft 4. As the shaft 4 rotates, oil leaking out between the metal sleeves 3 and the shaft 4 is guided into an oil storage 8 through the spiral groove 4', thereby preventing the oil from flowing outside.

DISCLOSURE OF THE INVENTION

Problem to be Solved by the Invention

However, according to the above configuration, bad lubrication is caused when oil infiltrated in the sleeves 3 is exhausted, so that seizure or abnormal wear is caused between the shaft 4 and the metal sleeves 3 and it is difficult to stably supply air to the fuel cell. In particular, considering relative high temperature atmosphere in which the air pump is used, the bearing of the metal sleeves 3 is difficult to obtain sufficient lifetime required for a mobile-use fuel cell.

In order to overcome the above problems, it is an object of the invention to provide an air pump that is capable of obtaining sufficient lifetime required for mobile-use fuel cells and stably supplying air for a long time.

Means to Solve the Problem

According to an air pump of the invention, in order to overcome the conventional problems, shafts of a pump section and a motor section are integrally formed and supported by two or more ball bearings.

In order to overcome the conventional problems, according to the above configuration, several times or several ten times amount of grease can be sealed in the ball bearings, as compared with the oil amount infiltrated in the metal sleeves. In addition, because the grease is sealed in a closed space in the bearings, little oil leaks out, and even under relatively high atmospheric temperature, sufficient lifetime can be achieved.

Therefore, according to the above configuration, it may be possible to obtain sufficient lifetime required for mobile-use fuel cells and to stably supply air for a long time.

According to a first embodiment of the invention, shafts of a pump section and a motor section are integrally formed and the integral shaft is supported by two bearings in the pump section, and the motor section is provided with no bearing. According to such configuration, the axial length of the motor section can be reduced by as much as the unnecessary space for a bearing in the motor section. On the other hand, as for the pump section, two plates are required to define a pump space regardless of a type of the pump and the axial length of the pump section can be reduced by disposing the ball bearings using the plates.

According to a second embodiment of the invention, shafts of a pump section and a motor section are integrally formed and the integral shaft is supported by at least one bearing in the pump section and at least one bearing in the motor section. According to such configuration, the distance between the supporting points for the shaft increases, so that the shaft does not easily incline or fall down. As a result, a rotor 202 in the motor section 200 does not interrupt the motor casing 203 around it.

Further, it may be preferable to provide two ball bearings in total. According to such configuration, because two ball bearings are provided, the shaft is positioned by the ball bearings and center-fitting is unnecessary for the shafts. For reference, if three or more bearings 300 are provided, as for the bearings after the third, center-fitting is necessary for the shafts. However, if the bearings and shafts are assembled without exact center-fitting, abnormal heating is caused in operation and the lifetime is considerably reduced.

Further, in the air pumps according to embodiments of the invention, a cylindrical rotor is disposed in a cylinder having cylindrical inner wall such that the rotor is eccentric to the center axis of the cylinder, a plurality of slits are axially formed in the rotor, plane-shape vanes formed of a self-lubricating material is slidably fitted in the slits, front and rear plates are disposed at the ends of the cylinder such that the rotor and vanes are disposed between the plates to defined a plurality of pump spaces, and a motor shaft is provided at the center axial of the rotor, whereby a pump section is configured, while a driving motor is provided at a side of the rear plate that is opposite to the pump section, and as the driving motor drives the motor shaft, the pump space is expanded or contracted. According to such configuration, an oilless mechanism is achieved, and differential pressure and the amount of supplying required for compensating pressure loss through the air passage in a fuel cell can be secured. Further, small-sizing, low noise, and long lifetime can be accomplished.

It may be preferable that gaps are defined between the rotor and the front plate and the rotor and the rear plate, one of the ball bearings is set as a fixed ball bearing by fixing both inner and outer race fitting portions, the other ball bearing is set as a slidable bearing by allowing one of the inner and outer race fitting portion to be slidable, and a pre-pressure spring is disposed to elastically support the slidable bearing. According to such configuration, because both inner and outer race fitting portions of a ball bearing is fixed, the shaft is axially positioned, and contact-sliding between the rotor and the front or rear plate can be prevented by defining gaps in assembling. Further, because desired pre-pressure can be applied to the other sliding bearing by the pre-pressure sprig, noise in operation can be reduced.

It may be preferable that in the motor section composed of a motor rotor and a stator, the motor rotor is disposed such that the axial center of a magnet mounted on the motor rotor is biased from the axial center of the stator to the pump section, and the pre-pressure sprig is disposed to push the rotor to the motor section. According to such configuration, the rotor always receives an axial load in one direction, so that the axial position of the rotor is restricted and chattering in operation can be prevented.

As for the slidable ball bearing, it may be preferable to allow the fitting portion of the inner race and the motor shaft to be slidable and dispose the pre-pressure spring between the rotor and the inner race.

Alternatively, the fitting portion of the outer race of the slidable ball bearing and the front plate may be slidable, and a pre-pressure spring may be disposed between a discharge plate disposed at a surface of the front plate that is opposite to the pump space and the outer race of the ball bearing.

As for the slidable ball bearing, the fitting portion of the inner race and the motor shaft may be slidable and the pre-pressure spring may be disposed between the motor rotor and the inner race.

Alternatively, as for the slidable ball bearing, the fitting portion of the outer race and the rear plate may be slidable and the pre-pressure spring may be disposed between the rear plate and the outer race.

According to the aforementioned configurations, in operation under high temperature atmosphere, even though each component is expanded by heat, changes in size are compensated by the slidable ball bearing and chattering of the ball bearing can be prevented. As a result, because noise does not increase and sufficient lifetime of the ball bearing can be obtained, stable performance can be achieved for a long time.

Effect of the Invention

According to air pumps of the invention, it is possible to secure lifetime required for a mobile-use fuel cell and maintain stable performance for a long time.

BEST MODE FOR CARRYING OUT THE INVENTION

Preferred embodiments of the invention are described hereinafter in detail with reference to accompanying drawings, but the invention is not limited to the embodiments.

Embodiment 1

Figure 1:
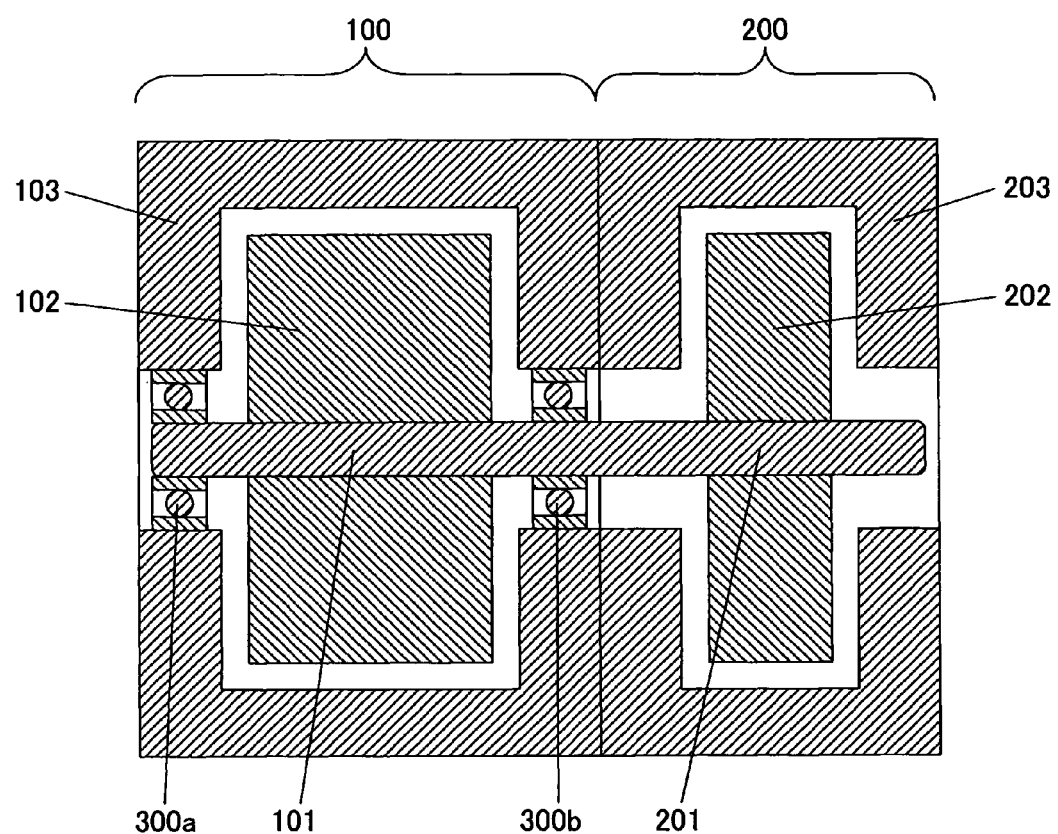
FIG. 1 is a vertical cross-sectional view of an air pump according to a first embodiment of the invention.

FIG. 1 shows a cross-sectional view of an air pump according to a first embodiment.

In FIG. 1, an air pump according to the embodiment of the invention includes a pump section 100 and a motor section 200. The pump section 100 has a shaft 101 at the center and a component 102 for blowing air is fitted to the shaft 101. Similarly, the motor section 200 has a shaft 201 at the center and a component 202 composing the motor is fitted to the shaft 201.

In typical pumps, particularly in positive-displacement pumps, the pump section 100 and the motor section 200 are separately assembled and the shafts 101 and 201 are connected by a coupling. However, center-fitting at the joint is needed for the shafts 101 and 201, and if the shafts are connected without center-fitting, a lot of problems appear, such as vibration and considerable reduction in lifetime of bearings.

Meanwhile, the pump section 100 may also a centrifugal type (e.g. fan or blow). In such configuration, in general, a fan is directly mounted to the shaft 201 of the motor section 200. However, in particular, as for a compact motor used for mobile-use fuel cells, metal sleeves are typically selected for a bearing in the motor section 200. Although metal sleeves are most suitable for compact motor, bad lubrication is caused when infiltrated oil is exhausted, so that seizure or abnormal wear is caused in the shafts 101 and 201 and the metal sleeves and it is difficult to stably supply air to a fuel cell. Considering relative high temperature atmosphere in which the air pump is used, the bearing of metal sleeves is difficult to obtain sufficient lifetime that is required for a mobile-use fuel cell.

In order to overcome the above problems, according to an embodiment of the invention, the shafts 101 and 201 of the pump section 100 and the motor section 200 are integrally formed, and the integral shaft is supported by ball bearings 300a and 300b disposed in a pump casing 103. The shafts 101 and 201 form a shaft without a connecting member. According to such configuration, center-fitting is unnecessary for the shafts 101 and 201, and vibration or wear in bearings is not caused accordingly. Further, by supporting the shafts with bearings 300a and 300b, several times or several ten times of grease, as compared with the amount of oil infiltrated in the metal sleeve, can be sealed in the ball bearings 300a and 300b. In addition, because the grease is sealed in a closed space in the bearings, basically little oil leaks out, furthermore, even though under relatively high temperature atmosphere, sufficient lifetime can be achieved. Therefore, according to the above configuration, it may be possible to achieve sufficient lifetime required for mobile-use fuel cells and to stably supply air for a long time.

Embodiment 2

Figure 2:
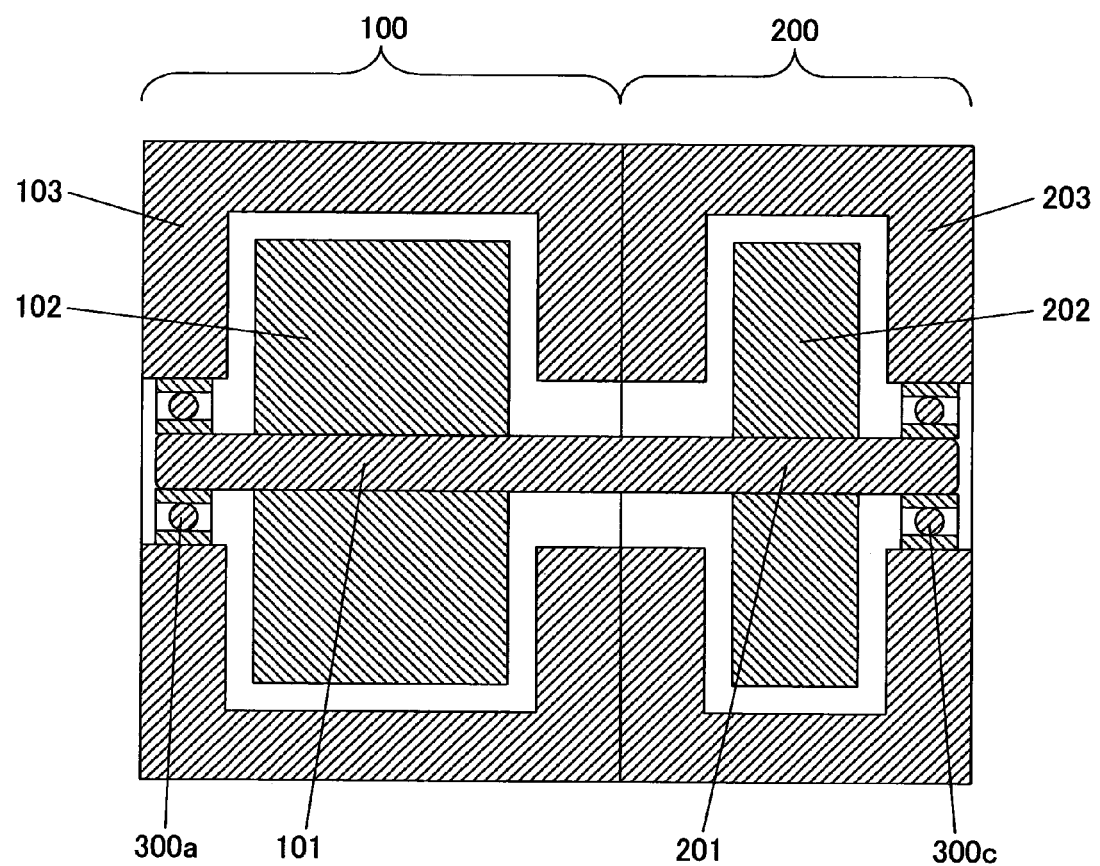
FIG. 2 is a vertical cross-sectional view of an air pump according to a second embodiment of the invention.

FIG. 2 shows a cross-sectional view of an air pump according to a second embodiment of the invention. The same components as in the first embodiment are represented by the same reference numerals for avoiding repetition.

Referring to FIG. 2, the shaft 101 and 201 are supported by the ball bearings 300a and 300c provided in the pump casing 103 and the motor casing 203, respectively. According to such configuration, the distance between the supporting points for the shafts 101 and 201 increases, so that the shaft does not easily incline or fall down. Accordingly, a rotor 202 in the motor section 200 does not interfere with the motor casing 203 around it.

For the first and second embodiments, more than two ball bearings 300 may be provided, but particularly two bearings are preferable. When two ball bearings 300 are provided, the shafts 101 and 201 are positioned with respect to the ball bearings 300 and center-fitting for the bearings 300 is unnecessary. However, if three or more bearings 300 are provided, as for the bearings 300 after the third, center-fitting is necessary for the shaft 101 and 102. Accordingly, if the bearings and shafts are assembled without exact center-fitting, abnormal heating is caused in operation and the lifetime is considerably reduced.

A centrifugal type and a positive-displacement type are known as typical types of the pump section 100 in the art, where a turbo type is typical in the centrifugal type, and reciprocate, rotary, scroll, screw, and diaphragm types are typical in the positive-displacement type. The types of the pump section in the first and second embodiments are not specified, and any type that compresses and blows air may be available, other than the above-mentioned types.

Embodiment 3

Figure 3:
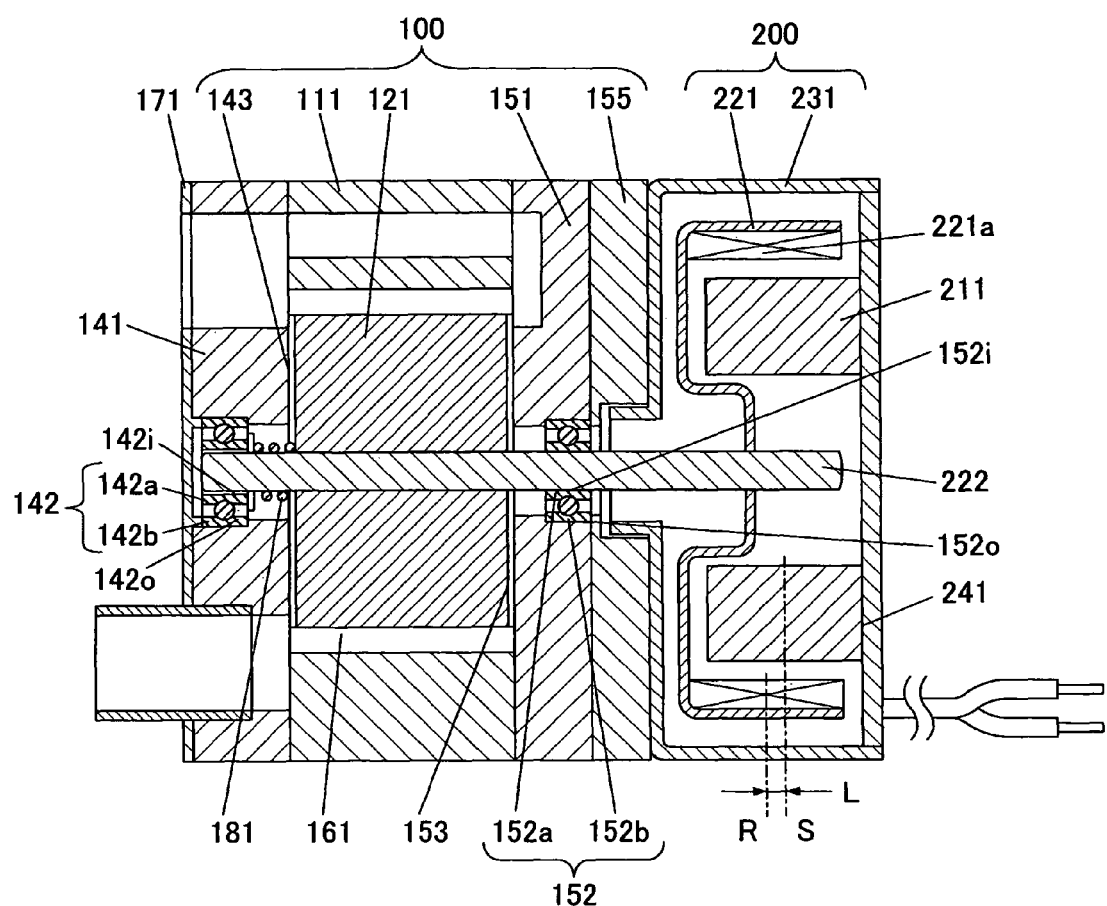
FIG. 3 is a vertical cross-sectional view of an air pump according to a third embodiment of the invention.
Figure 4:
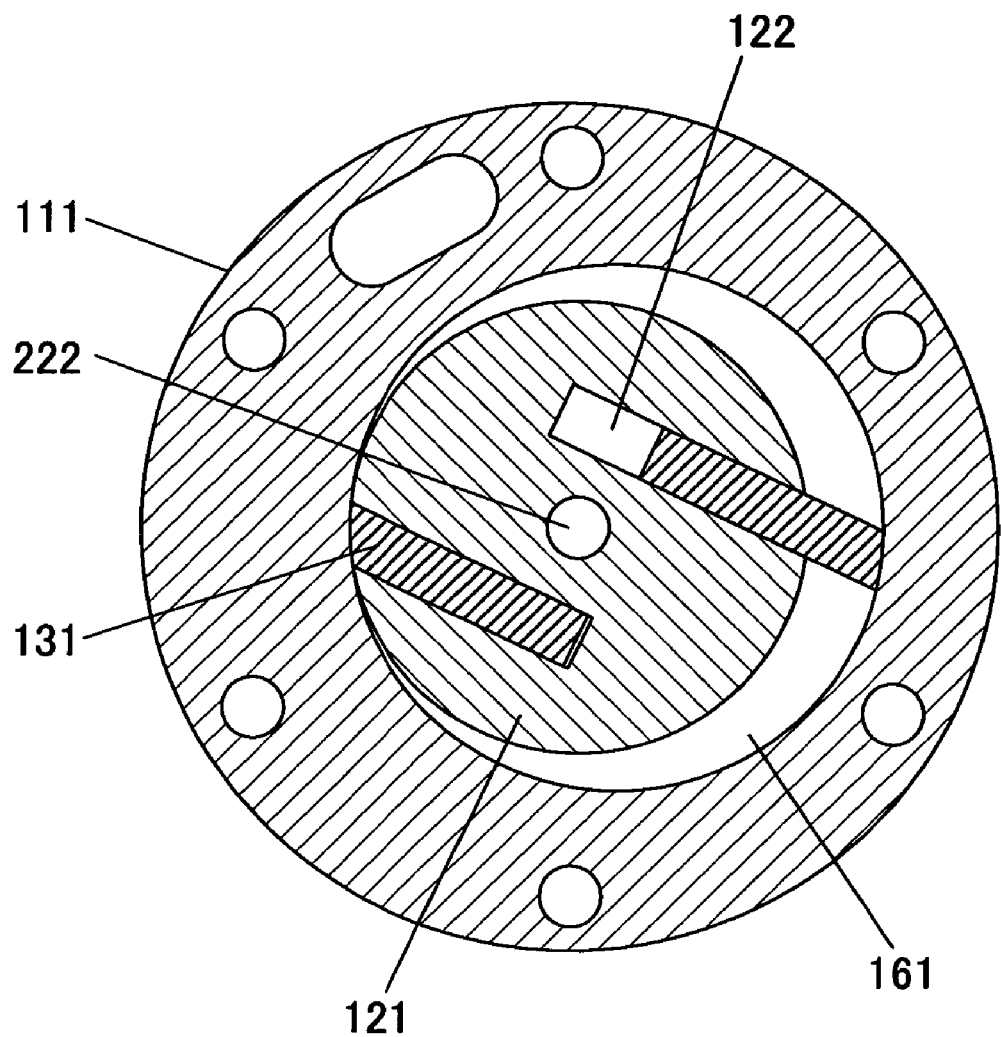
FIG. 4 is a cross-sectional view of a pump section in the air pump according to the third embodiment of the invention.

FIGS. 3 and 4 show cross-sectional views of an air pump according to a third embodiment of the invention.

Referring to FIGS. 3 and 4, the pump section 100 includes a cylinder 111 having a cylindrical inner wall, a cylindrical rotor 121, vanes 131 formed of a self-lubricating material, and front and rear plates 141 and 151 respectively having a surface applied with a self-lubricating material. The rotor 121 is eccentric to the center axis of the cylinder 111 and the vanes 131 are slidably fitted in a plurality of slits 122 formed in the center axis direction of the rotor 121. The front and rear plates 141 and 151 are disposed at both ends of the cylinder such that the rotor 121 and vanes 131 are interposed between them, and a plurality of pump spaces 161 are defined. In this configuration, the front and rear plates 141 and 151 are disposed such that their surfaces applied with a self-lubricating material face each other.

The motor section 200 is provided with a DC motor that is composed of a circuit board 241, a stator 211, motor rotor 221, a motor shaft 222, and a casing 231. The stator 211 is mounted on the circuit board 241 and the motor rotor 221 fitted to the motor shaft 222 surrounds the stator 211. The casing 231 covers the motor stator 211 and the motor rotor 221 and is fixed to the circuit board 241. The motor in the embodiment is a DC brushless motor having long lifetime and the circuit board 241 generates controlling orders for driving the brushless motor.

The motor shaft 222 of the motor section 200 is fitted in the center of the rotor 121. The motor shaft 222 is slidably supported by a ball bearing 142 provided to the front plate 141 and a ball bearing 152 provided to the rear plate 151. The ball bearings 142 and 152 are grease-sealing types and disposed at the sides of the plates that are opposite from the pump space. A discharge plate 171 is also disposed at the side of the front plate 141 opposite from the pump space and restricts the position of the ball bearing 142, while preventing compressed air in the pump space 161 from leaking out through the ball bearing 142. The pump section 100 and the motor section 200 are connected through a mounting plate 155.

Subsequently, operations of each components in the embodiment are described below. When DC power is supplied to the circuit board 241, the motor rotor 221 is rotated by rotational torque generated by a magnetic field between the motor rotor 221 and the stator 211. On the other hand, because the motor shaft 222 fitted in the motor rotor 221 and the rotor 121 fitted to the motor shaft 222 are rotatably supported by the ball bearing 142 and 152, as they integrally rotate, the vanes 131 reciprocate in the rotor slits 122. Further, the edges of the vanes 131 are in contact with the inside of the cylinder 111 during the rotation, so that the pump space 161 is sectioned as a result, and a pump function is completed by repeating intake, compression and discharge.

As for the embodiment, the pump section 100 is a vane rotary type positive-displacement pump. According to such type of positive-displacement pump, an oilless mechanism is achieved, and it is possible to securely obtain the differential pressure and the supply amount of air each required for complementing pressure loss through the air passage of the fuel cell. Further, down-sizing, low noise, and long lifetime can be accomplished.

Embodiment 4

The same components as in the third embodiment are represented by the same reference numerals for avoiding repetition.

Referring to FIG. 3, gaps 143 and 153 are formed between the rotor 121 and the front plate 141, and the rotor 121 and the rear plate 151, respectively, the inner and outer race fitting portions 152$i$ and 152$o$ of the ball bearing 152 are fixed, the outer race fitting portion 142$o$ of the ball bearing 142 is fixed and the inner race fitting potion 142$i$ is slidable, and pre-pressure spring is provided to elastically support the inner race fitting portion 142$i$. According to the above configuration, because the inner and outer race fitting portions 152$i$ and 152$o$ of the ball bearing 152 are fixed, the motor shaft 222 is axially positioned, and contact-sliding of rotor 121 and the front plate 141 or the rear plate 151 is prevented by defining the gaps 143 and 153 in assembling. Further, noise can be reduced in operation, because pre-pressure by the pre-pressure spring 181 is applied to the ball bearing 142.

Embodiment 5

The same components as in the third embodiment are represented by the same reference numerals for avoiding repetition.

Referring to FIG. 3, the motor 221 is disposed such that the axial center R of a magnet 221$a$ mounted to the motor rotor 221 is biased by a distance L from the axial center S of the stator 211 toward the pump section 100, and the pre-pressure spring 181 is disposed to push the rotor 121 toward the motor section 200.

In the vane rotary positive-displacement pump, pressure difference originally does not appear at the axial ends of the rotor 121. However, because a back pressure groove, intake port, or discharge port is formed in the front plate 141, pressure difference appears with respect to the rear plate 151. As a result, as the rotor 121 axially reciprocates due to changes in pressure at the ends, noise is created. Further, according to the configuration for disposition of the pump, load acts always in one direction, for example, by the own weight of the rotor 121, so that the rotor 121 is likely to contact with the front plate 141 or the rear plate 151, while rotating.

According to the above configuration, a magnetic force acts such that the axial center R of the magnetic 221$a$ coincides with the axial center S of the stator 211, and a force by the pre-pressure spring 181 also acts in the same direction. In other words, axial load is applied to the groove in one direction, so that the axial position of the rotor 121 is fixed regardless of the position of the pump and chattering in the operation can be prevented.

Embodiment 6

The same components as in the third embodiment are represented by the same reference numerals for avoiding repetition.

One of the ball bearing 142 and 152 is set as a fixed ball bearing by fixing the inner and outer race fitting portions, and the other ball bearing is set as a slidable ball bearing by fixing one of the inner and outer race fitting portions and allowing the other to be slidable, and the pre-pressure spring 181 is disposed to the slidable ball bearing to elastically support it. According to such configuration, the motor shaft 222 is positioned by the fixed ball bearing of which both fitting portions are fixed, and axial load applied to the motor shaft 222 is supported by the fixed ball bearing. When the other ball bearing is additionally pressed by the pre-pressure spring 181, axial load is applied to the motor shaft 222 through rolling elements in the ball bearing and desired pre-pressure is applied to the ball bearings 142 and 152. As a result, it is possible to prevent noise created by the motion of the balls in the ball bearings in operation. Further, because the fitting portion where the pre-pressure spring 181 is disposed is slidable, although each component is expanded by heat in operation under high temperature atmosphere, changes in the size can be compensated.

Subsequently, a method of disposing the pre-pressure spring 181 is described below in detail. According to a first configuration, the ball bearing 152 is, as a fixed ball bearing, fixed by fixing the fitting portion 152i of the inner race 152a and the motor shaft 222 and the fitting portion 152o of the outer race 152b and the rear plate 151. On the other hand, the ball bearing 142 is, as a slidable ball bearing, slidable by fixing the fitting portion 142o of the outer race 142b and the front plate 141 and allowing the fitting portion 142i of the inner race 142a and the motor shaft 222 to be slidable, and the pre-pressure spring 181 is disposed between the inner race 142a and the rotor 121.

Figure 5:
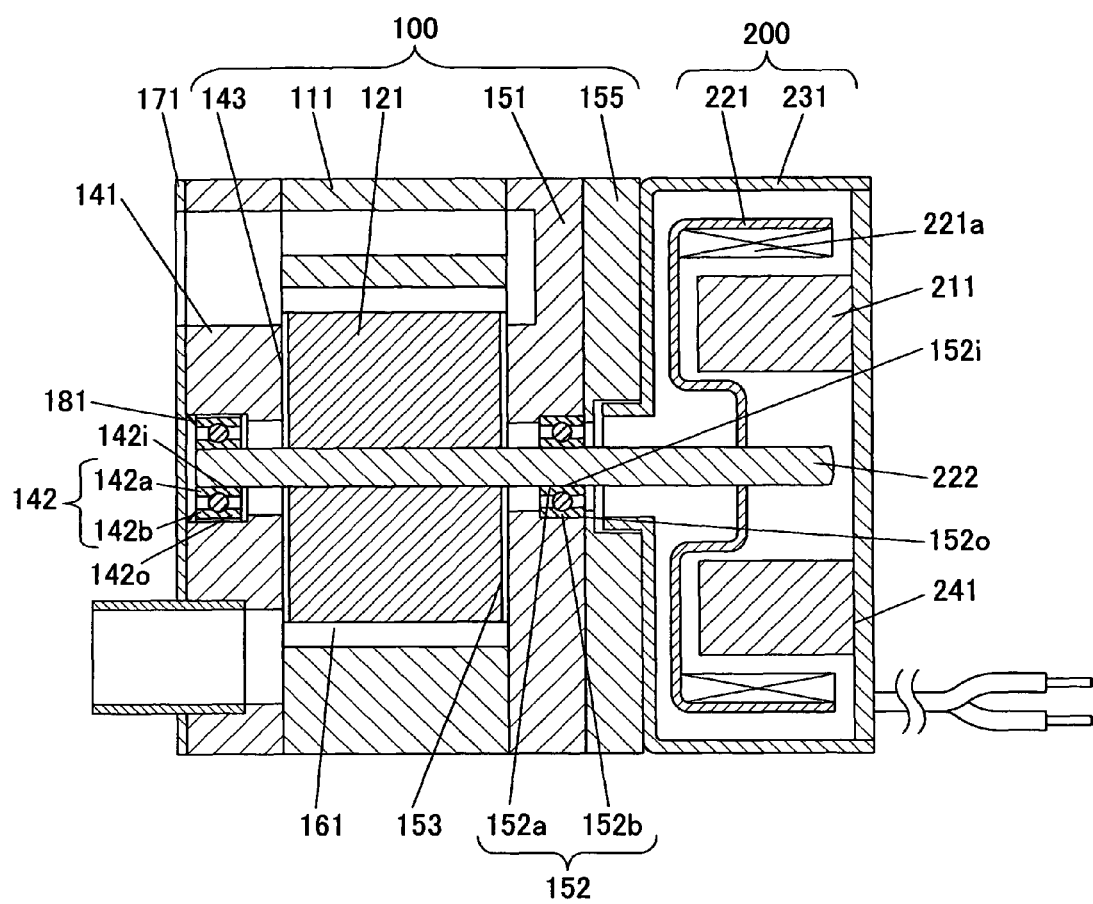
FIG. 5 is a vertical cross-sectional view of an air pump according to a sixth embodiment of the invention.

According to a second configuration shown in FIG. 5, the ball bearing 152 is, as a fixed ball bearing, fixed by fixing the fitting portions 152i and 152o of the inner race 152a and the motor shaft 222 and the outer race 152b and the rear plate 151. On the other hand, the ball bearing 142 is, as a slidable ball bearing, slidable by fixing the fitting portion 142i of the inner race 142a and the motor shaft 222 and allowing the fitting portion 142o the outer race 142b and the front plate 141 to be slidable, and the pre-pressure spring 181 is disposed between the outer race 142b and the discharge plate 171.

Figure 6:
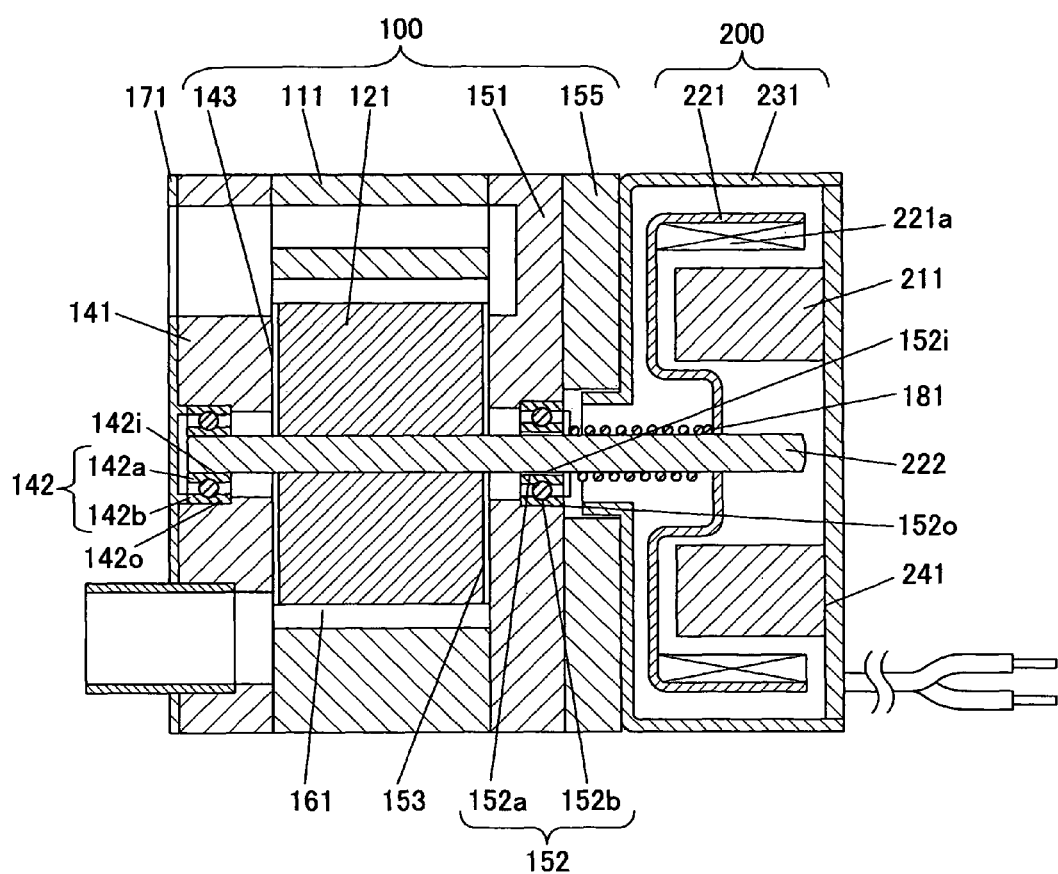
FIG. 6 is a vertical cross-sectional view of an air pump according to a sixth embodiment of the invention.

According to a third configuration shown in FIG. 6, the ball bearing 142 is, as a fixed ball bearing, fixed by fixing the fitting portion 142i of the inner race 142a and the motor shaft 222 and the fitting portion 142o of the outer race 142b and the front plate 141. On the other hand, the ball bearing is, as a slidable ball bearing, slidable by fixing the fitting portion 152o of the outer race 152b and the rear plate 151 and allowing the fitting portion 152i of the inner race 152a and the motor shaft 222 to be slidable, and the pre-pressure spring 181 is disposed between the inner race 152a and the motor rotor 221.

Figure 7:
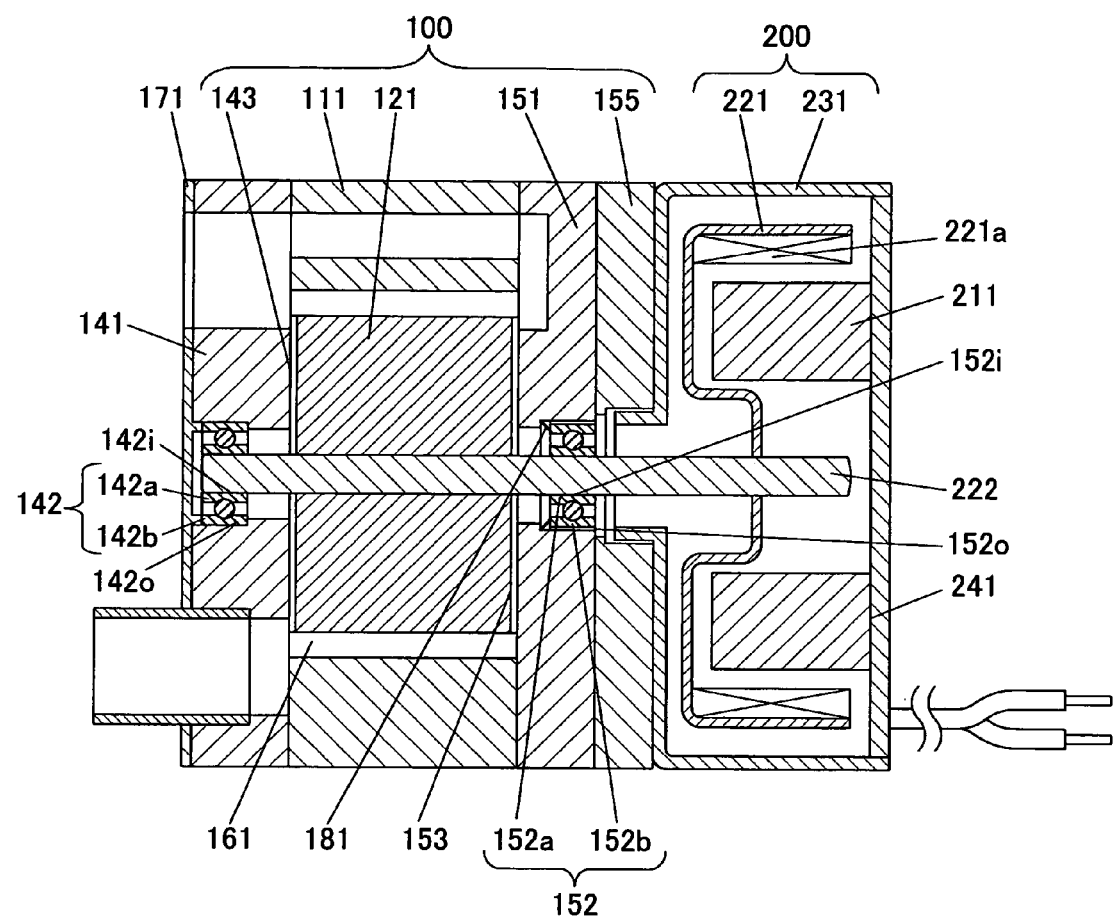
FIG. 7 is a vertical cross-sectional view of an air pump according to a sixth embodiment of the invention.
Figure 8:
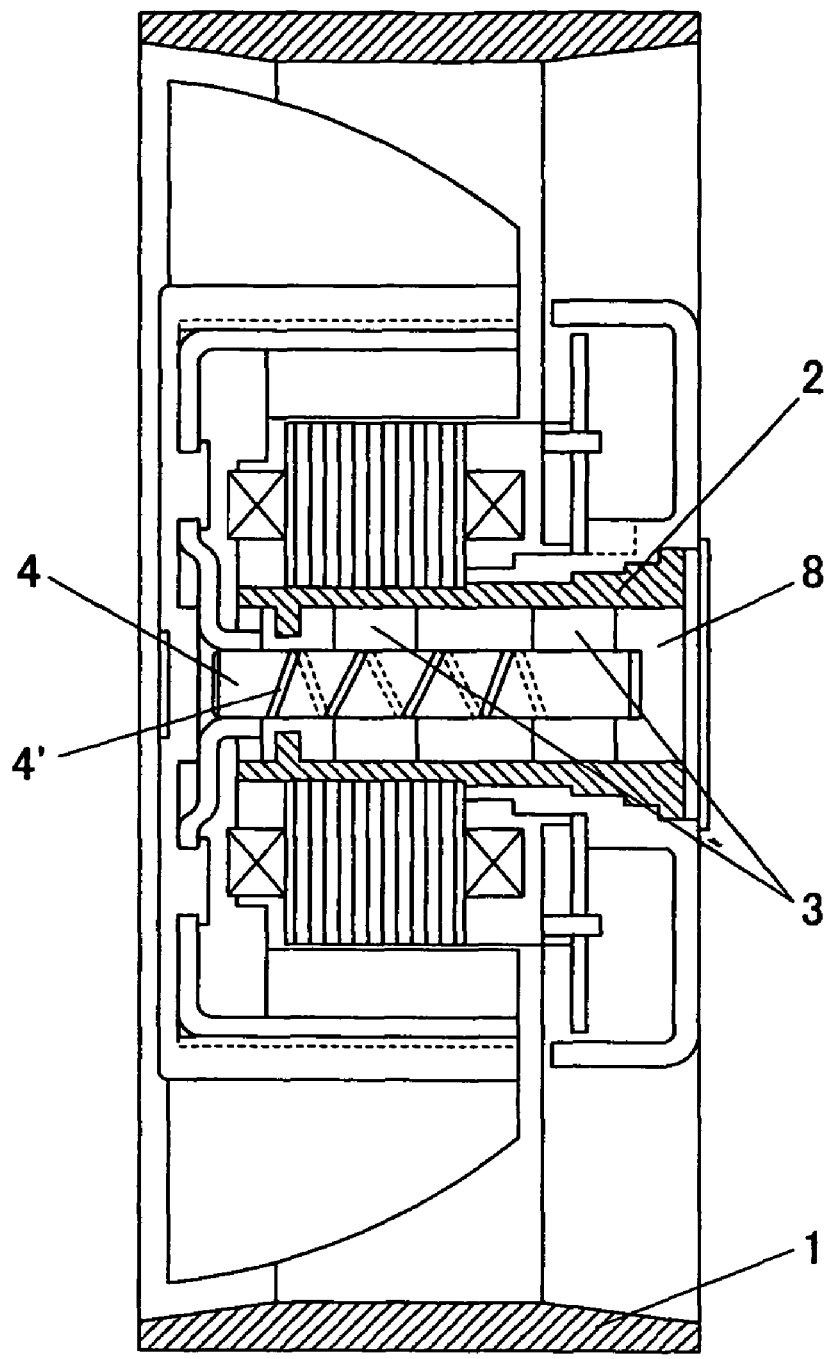
FIG. 8 is a cross-sectional view of a conventional fan motor.

According to a fourth configuration shown in FIG. 7, the ball bearing 142 is, as a fixed ball bearing, fixed by fixing the fitting portion 142i of the inner race 142a and the motor shaft 222 and the fitting portion 142o of the outer race 142b and the front plate 141. On the other hand, the ball bearing 152 is, as a slidable ball bearing, slidable by fixing the fitting portion 152i of the inner race 152a and the motor shaft 222 and allowing the fitting portion 152a of the outer race 152b and the rear plate 151 to be slidable, and the pre-pressure spring 181 is disposed between the outer race 152b and the rear plate 151.

The fitting portions may be fixed by press-fitting or adhesion, and the pre-pressure spring may be a washer spring or a coil spring.

For all the above configurations, axial load generated by a magnetic force is supported by a fixed ball bearing of which both inner and outer race fitting portions are fixed. Pre-pressure is necessarily applied to the ball bearing, because it supports the axial load. On the other hand, the other ball bearing is elastically supported by the pre-pressure spring 181. However, considering the direction of the axial load caused by a magnetic force, the pre-pressure spring is needed. The loading direction applied to the motor shaft 222 by the pre-pressure spring 181 coincides with that caused by a magnetic force, and the rotor 121 is pushed toward the motor section 200 in the present invention. Accordingly, axial chattering of the rotor 121 can be prevented regardless of the position of the pump, while maintaining a magnetic force action, and contact-sliding between the rotor 121 and the front plate 141 or the rear plate 151 can be prevented.

INDUSTRIAL APPLICABILITY

According to the invention, because an air pump is capable of having stable performance for a long time, it is applicable to air pumps for use in an air supplier of a mobile-use information terminal using a fuel cell and an air supplier for a domestic health care machine or a medical instrument.

The invention claimed is:

1. An air pump comprising:
    a pump section (100) for compressing and blowing air;
    a motor section (200) in contact with the pump section (100) for driving the pump section (100); and
    a shaft (222) positioned from the pump section (100) to the motor section (200) and supported by two ball bearing units (142, 152) at a base portion thereof, wherein
    the pump section (100) comprises:
        a cylinder (111) having a tubular inner wall,
        a front plate (141) attached to one end of the cylinder (111) on an opposite side of the pump section (100) from the motor section (200),
        a rear plate (151) attached to another end of the cylinder (111) on the same side of the pump section (100) as the motor section (200),
        a plurality of pump spaces (161) surrounded by the cylinder (111), the front plate (141) and the rear plate (151), and
        a rotor (121) positioned in the pump space (161) and attached to the shaft (222) to be rotatably driven thereby,
        wherein the shaft (222) and cylindrical rotor (121) are eccentric with respect to an axis of the tubular inner wall of the cylinder (111),
        the rotor (121) includes a plurality of axially extending slits (122),
        plane-shaped vanes (131) are fitted in the slits (122) to define the plurality of pump spaces (161) within the cylinder (111),
        one of the two ball bearing units (142) is attached to the front plate (141),
        another of the two ball bearing units (152) is attached to the rear plate (151),
        the shaft (222) has a top portion in the motor section (200), and the motor section (200) comprises:
- a motor rotor (221) connected to the top portion of the shaft (222), wherein the distance between the connecting position of the motor rotor (221) and the shaft (222) and the rear plate (151) is less than the distance between the axial center (S) of the stator (211) and the rear plate (151),
- a casing (231) connected to the rear plate (151) for covering the motor rotor (221), and
- a stator (211) positioned farther away from the rear plate (151) than the motor rotor (221) and supported in the casing (231) by the rear plate (151) for generating a rotating magnetic field for the motor rotor (221).

2. The air pump according to claim 1, wherein the shaft is supported by at least two ball bearings provided in the pump section, and the motor section is provided with no bearing.

3. The air pump according to claim 1, wherein the shaft is supported by at least one ball bearing provided in the pump section and one ball bearing provided in the motor section.

4. The air pump according to claim 1, wherein there are gaps (143, 153) respectively between the rotor (121) and the front plate (141) and the rotor (121) and the rear plate (151), one of the ball bearings is a fixed ball bearing wherein both inner and outer race portions thereof are fixed, and the other ball bearing is a slidable bearing wherein one of the inner and outer race portions thereof is slidable, and a pre-pressure spring (181) elastically biases the slidable bearing away from rotor (121).

5. The air pump according to claim 4, wherein the motor rotor (211) is positioned such that the axial center (R) of a magnet mounted on the motor rotor is biased from the axial center (S) of the stator toward the pump section (100), and the pre-pressure spring (181) is positioned to push the rotor (121) toward the motor section (200).

6. The air pump according to claim 4, wherein the fitting portion of the inner race of the slidable ball bearing and the motor shaft are slidable, and the pre-pressure spring is between the rotor and the inner race of the ball bearing.

7. The air pump according to claim 4, wherein the fitting portion of the outer race of the slidable ball bearing and the front plate are slidable, and the pre-pressure spring is disposed between a discharge plate at a surface of the front plate that is opposite to the pump space and the outer race of the ball bearing.

8. The air pump according to claim 4, wherein the fitting portion of the inner race of the slidable ball bearing and the motor shaft are slidable, and the pre-pressure spring is between the motor rotor and the inner race of the ball bearing.

9. The air pump according to claim 4, wherein the fitting portion of the outer race of the slidable ball bearing and the rear plate are slidable, and the pre-pressure spring is between the rear plate and the outer race of the ball bearing.

\* \* \* \* \*